United States Patent [19]

Gastinger et al.

[11] Patent Number: 5,021,506

[45] Date of Patent: Jun. 4, 1991

[54] POLYOL POLYACRYLATE DISPERSANTS

[75] Inventors: Robert G. Gastinger, West Chester, Pa.; John E. Hayes, Wilmington, Del.

[73] Assignee: ARCO Chemical Technology, Inc., Wilmington, Del.

[21] Appl. No.: 226,347

[22] Filed: Jul. 29, 1988

[51] Int. Cl.$^5$ .................... C08L 51/08; C08L 33/08; C08L 32/10; C08L 71/02

[52] U.S. Cl. .................... 525/63; 525/69; 525/187

[58] Field of Search .................... 525/63, 412, 330.3, 525/69, 187

[56] References Cited

U.S. PATENT DOCUMENTS

| | | | |
|---|---|---|---|
| 4,148,840 | 4/1979 | Shah | 260/859 R |
| 4,242,249 | 12/1980 | Van Cleve et al. | 260/33.2 R |
| 4,327,005 | 4/1982 | Ramlow et al. | 524/377 |
| 4,334,049 | 6/1982 | Ramlow et al. | 526/202 |
| 4,745,153 | 5/1988 | Hoffman | 524/762 |

FOREIGN PATENT DOCUMENTS

87/03886  7/1987  World Int. Prop. O. .

OTHER PUBLICATIONS

Twaik, Tahan & Zilkha, "Grafting of Poly(ethylene Oxide) on Poly(methylmethacrylate) by Transesterification", J. Polymer Science, A-1, 7, pp. 2469, et seq.

*Primary Examiner*—Allan M. Lieberman
*Attorney, Agent, or Firm*—Dennis M. Kozak

[57] ABSTRACT

A stable, low viscosity polymer polyol composition comprising a continuous phase, a disperse phase within the continuous phase, and a dispersant for enhancing the stability of the resultant polymer polyol is disclosed. In one embodiment, the dispersant is formed by polymerizing at least one acrylate monomer in a polyether polyol to form a single phase homogeneous liquid intermediate reaction product which is transesterified to form a polyol polyacrylate dispersant.

31 Claims, No Drawings

POLYOL POLYACRYLATE DISPERSANTS

This application is related to U.S. patent application Ser. No. 07/226,329, filed of even date, entitled "Polyacrylate Graft-Polyol Dispersants."

This invention relates to polyol polyacrylates.

More specifically, this invention relates to polyol polyacrylates prepared from a polyol and at least one acrylate monomer or polymer followed by transesterification.

In one of its more specific aspects, this invention pertains to the incorporation of a polyol polyacrylate into a polymer polyol composition for the purpose of improving the stability of dispersed vinyl polymer particles contained in the polymer polyol.

Polymer polyols containing vinyl polymer particles dispersed in a continuous polyol phase are well known. Also well known is the tendency of polymer polyols to undergo phase separation if they are not stabilized. Hence, polymer polyols are generally stabilized against phase separation by incorporation of a dispersant during formation. U.S. Pat. Nos. 4,148,840 and 4,242,249 teach that certain preformed polymer polyols are suitable dispersion stabilizers. U.S. Pat. Nos. 4,327,055 and 4,334,049 teach that alkylene oxide adducts of styrene-/allyl alcohol copolymers can be used as polymer polyol dispersants.

A more recent publication (see International Publication No. W087/03886 and U.S. Pat No. 4,745,153) teaches a preformed dispersant formed by homopolymerizing a vinyl-terminated adduct or copolymerizing the adduct with an ethylenically unsaturated monomer or monomer mixture in the presence of an active hydrogen-containing compound as a solvent.

Also known is the formation of graft polymers by the grafting of the potassium alkoxide derivative of poly(ethylene oxide) on poly(methylmethacrylate) in homogeneous solution in toluene. [See M.A. Twark, M. Tahan, and A. Zilkha, "Grafting of Poly(ethylene oxide) on Poly(methylmethacrylate) by Transesterification," Journal of Polymer Science: Part A-1, Vol. 7, 2469-2480 (1969)].

This invention provides novel polyol polyacrylates which are particularly suitable for incorporation into polymer polyols for the purpose of stabilizing the polymer polyols against phase separation.

The polyol polyacrylates of this invention can be prepared by alternative methods. In one method, the in situ method, a polyacrylate graft-polyol intermediate product is first formed by polymerizing esters of acrylic and methacrylic acid in situ in a polyoxyalkylene polyether polyol followed by a transesterification reaction to produce a polyol polyacrylate. In the other method, the blend method, a homopolymer or copolymer of (meth)acrylate esters is separately prepared and blended with a polyoxy alkylene polyether polyol. The resulting blend is converted into a polyol polyacrylate by a transesterification reaction.

According to this invention, there is provided a stable polymer polyol composition comprising a continuous phase, a disperse phase within the continuous phase, and a dispersant for enhancing the stability of the polymer polyol, wherein (a) the disperse phase consists essentially of vinyl polymer particles; (b) the continuous phase consists essentially of a polyoxyalkylene polyether polyol; and (c) the dispersant is a polyol polyacrylate formed by polymerizing from about 5 to about 90 weight percent of at least one acrylate monomer selected from the group consisting of $C_1$-$C_{20}$ alkyl esters of acrylic and methacrylic acids with from about 95 to about 10 weight percent of a polyoxyalkylene polyether polyol to form a single phase homogeneous liquid intermediate reaction product followed by transesterifying from about 1 to about 30 mole percent of the total ester groups of the acrylate with the hydroxyl groups of a polyoxyalkylene polyether polyol to form the polyol polyacrylate dispersant, said dispersant being employed in an amount sufficient to enhance the stability of the resulting polymer polyol as compared to the stability of the polymer polyol in the absence of polyol polyacrylate dispersant. All three polyoxyalkylene polyether polyols may be the same polyol or different polyols.

Also according to this invention, there is provided a stable polymer polyol composition comprising a continuous phase, a disperse phase within the continuous phase, and a dispersant for enhancing the stability of the polymer polyol, wherein (a) the disperse phase consists essentially of vinyl polymer particles; (b) the continuous phase consists essentially of a polyoxyalkylene polyether polyol; and (c) the dispersant is a polyol polyacrylate formed by blending from about 5 to about 90 weight percent of at least one acrylate polymer selected from the group consisting of homopolymers and copolymers of $C_1$-$C_{20}$ alkyl esters of acrylic and methacrylic acids with from about 95 to about 10 weight percent of a polyoxyalkylene polyether polyol to form a single phase homogeneous liquid intermediate blend followed by transesterifying from about 1 to about 30 mole percent of the total ester groups of the acrylate with the hydroxyl groups of a polyoxyalkylene polyether polyol to form the polyol polyacrylate dispersant, said dispersant being employed in an amount sufficient to enhance the stability of the resulting polymer polyol as compared to the stability of the polymer polyol in the absence of polyol polyacrylate dispersant. All three polyoxyalkylene polyether polyols may be the same polyol or different polyols.

According to this invention, there is also provided a method for producing the stable polymer polyols described above, which method comprises polymerizing an ethylenically unsaturated monomer or mixture of monomers (which form the disperse phase of vinyl polymer particles) in a blend of the polyoxyalkylene poly ether polyol continuous phase and the polyol polyacrylate dispersant.

According to this invention, there is also provided a method of stabilizing a polymer polyol comprising vinyl polymer particles dispersed in a continuous polyol phase against phase separation, which method comprises incorporating into the polymer polyol composition a dispersant consisting of a polyol polyacrylate, the dispersant being employed in an amount sufficient to improve the stability of the polymer polyol.

Polyurethanes produced using the above described polymer polyols are also provided by this invention.

In the in situ method described above, the polyacrylate graft-polyol intermediate can be prepared by polymerizing any suitable acrylate monomer or monomer mixture. Suitable acrylate monomers include the $C_1$ to $C_{20}$ alkyl esters of acrylic and methacrylic acids. Particularly suitable acrylate monomers are methyl acrylate, ethyl acrylate, propyl acrylate, N-butyl acrylate, and the like and their mixtures. Most preferred are N-butyl acrylate or a mixture of N-butyl and ethyl acrylates.

The acrylate monomer or monomer mixture is then polymerized in situ in a suitable polyol. Accordingly, the acrylate monomer must be soluble in the polyol. Polyols which can be employed include the polyoxyalkylene polyether polyols which are the polymerization products of an alkene oxide or a mixture of alkene oxides with a polyhydric alcohol. Preferably, the polyol is a 500 to 15,000 molecular weight hydroxyl terminated polyether prepared by the polymerization of an alkylene oxide in the presence of a di-, tri-, or tetra-hydric initiator. The preferred alkylene oxide is propylene oxide.

In one embodiment of this invention, the polyacrylate graft polyol intermediate will be formed by polymerizing from about 5 to about 90 total weight percent, preferably from about 20 to about 50 total weight percent, of at least one acrylate monomer in a polyoxyalkylene polyether polyol at a reaction temperature within the range of from about 60 to about 150° C. The resulting intermediate product formed, a single phase, homogeneous liquid, must then undergo a transesterification reaction to form a polyol polyacrylate dispersant of this invention.

In another embodiment pertaining to the blend method for forming a polyol polyacrylate, an acrylate homopolymer or a copolymer is separately prepared and employed as a starting material to form the intermediate. Any suitable homopolymer or copolymer of (meth)acrylate esters can be used. Particularly suitable for use are the homopolymers and copolymers of the acrylate monomers listed above as being suitable for use in the in situ method for forming a polyol polyacrylate. The acrylate homopolymer or copolymer is then blended with one or more polyoxyalkylene polyether polyols as described above to give a blended intermediate product which upon transesterification gives a polyol polyacrylate dispersant of this invention. The blended intermediate product will be formed to contain from about 5 to about 90 weight percent acrylate polymer, preferably from about 20 to about 50, with the balance being polyol.

The formation of a polyol polyacrylate dispersant from either intermediate product requires a further transesterification reaction, typically, but not necessarily, carried out in additional polyoxyalkylene polyether polyol using a suitable transesterification catalyst. The polyol, if added, may be the same as or different than the polyol used to form the intermediate. After transesterification, the weight percent acrylate polymer in the polyol polyacrylate should be from about 5 to about 30, preferably about 10 to about 25. Accordingly, depending on the weight percent acrylate polymer in the intermediate, it may or may not be desirable to use additional polyol in the transesterification reaction. The transesterification reaction occurs between the terminal hydroxyl groups of the polyol and the ester groups of the acrylate polymer. From about 1 to about 30 mole percent, preferably from about 5 to about 25 mole percent of the total ester groups of the acrylate polymer react with the hydroxyl groups of the polyol.

The transesterification catalysts are such as are conventionally employed. Among the catalysts which can be employed are alkali metal oxides, hydroxides or alkoxides, particularly those of potassium or sodium; oxides, alkyls, carboxylates, halides and alkoxides of transition metals such as tin, zinc, zirconium, titanium, aluminum, and manganese; sulfuric acid; hydrochloric acid, and alkyl or aryl sulfonic acids. Solid acids such as Nafion resin, Amberlyst resin, and zeolites and other molecular sieves can also be used and the like.

The polymer polyols of this invention will be formed by polymerizing an ethylenically unsaturated monomer or mixture of monomers in a polyol mixture comprising at least one polyoxyalkylene polyol and a polyol polyacrylate dispersant in the presence of a free radical initiator at a temperature from about 60° C. to about 150° C.

Any conventional process for preparing polymer polyols can be employed including batch, semi-batch, and continuous processes. The preferred process is a semi-batch process in which all or at least a major amount of the polyol polyacrylate dispersant is added in the reactor charge and the major amount of polyol is added in the feed charge. It is most preferred to add all of the dispersant in the reactor charge. If a plurality of continuous stirred tank reactors (CSTR) in series is employed, the charge to the first CSTR preferably includes all or at least the major amount of dispersant. To the second CSTR, in addition to the product feed from the first CSTR, will be added the feed charge containing the major amount of polyol.

The amount of the polyol polyacrylate dispersant employed to produce the polymer polyol will be within the weight percent range of from about 0.1 to about 10, preferably from about 0.3 to about 5 based on the total amount of monomer, polyol, and dispersant employed. The weight ratio of total monomer or monomer mixture (or disperse phase) to polyol (or continuous phase) will be from about 1:19 to about 1:1.

The preferred ethylenically unsaturated monomers employed to produce polymer polyols of the present invention are both styrene and acrylonitrile to make a copolymer. The copolymer will contain in weight percent 20 to 100 styrene with the balance being acrylonitrile. Other suitable monomers include, but are not limited to, butadiene, isoprene, 1,4-pentadiene, 1,6-hexadiene, 1,7-octadiene, acrylonitrile, methacrylonitrile, α-methylstyrene, methylstyrene, 2,4-dimethylstyrene, ethyl styrene, isopropylstyrene, butylstyrene, substituted styrenes, such as cyanostyrene, phenylstyrene, cyclohexylstyrene, benzylstyrene, substituted styrenes such as cyanostyrene, nitrostyrene, N,N-dimethylaminostyrene, acetoxystyrene, methyl 4-vinylbenzoate, phenoxystyrene, p-vinyl diphenyl sulfide, p-vinylphenyl phenyl oxide, acrylic and substituted acrylic monomers such a acrylic acid, methacrylic acid, methyl acrylate, 2-hydroxyethyl acrylate, 2-hydroxyethyl methacrylate, methyl methacrylate, cyclohexyl methacrylate, benzyl methacrylate, isopropyl methacrylate, octyl methacrylate, ethyl α-ethoxyacrylate, methyl α-acetoaminoacrylate, butyl acrylate, 2-ethylhexyl acrylate, phenyl methacrylate, N,N-dimethylacrylamide, N,N-dibenzylacrylamide, N-butylacrylamide, methacrylyl formamide, vinyl esters, vinyl ethers, vinyl ketones, vinyl acetate, vinyl alcohol, vinyl butyrate, isopropenylacetate, vinyl formate, vinyl acrylate, vinyl methacrylate, vinyl methoxy acetate, vinyl benzoate, vinyl toluene, vinyl naphthalene, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phenyl ketone, vinyl ethyl sulfide, vinyl ethyl sulfone, N-methyl-N-vinyl acetamide, N- vinylpyrrolidone, vinyl imidazole, divinyl sulfide, divinyl sulfoxide, divinyl sulfone, sodium vinyl sulfonate, methyl vinyl sulfonate, N-vinyl pyrrole, dimethyl fumarate, dimethyl maleate, maleic acid, crotonic acid fumaric acid, itaconic acid, monomethyl itaconate, t-butylaminoethyl methacrylate, dimethylaminoethyl methacrylate, glycidyl acrylate, allyl alcohol, glycol monoesters of itaconic acid, vinyl pyridine, maleic anhydride, maleimide, N-substituted maleimides, such as N-phenylmaleimide and the like.

The polymerization initiator may be any suitable initiator for the particular monomers employed. Suitable catalytic initiators useful in producing the polymer polyol compositions of this invention are the free radical type of vinyl polymerization catalysts, such as the peroxides, persulfates, perborates, percarbonates, azo compounds, and the like. Specific examples include, but are not limited to, 2,2'-azo-bis-isobutyro-nitrile (AIBN), dibenzoyl peroxide, lauroyl peroxide, di-t-butyl peroxide, diisopropyl peroxide carbonate, t-butyl peroxy-$\omega$-ethylhexanoate, t-butylperpivalate, 2,5-dimethyl-hexane-2,5-di-per-2-ethyl hexoate, t-butylperneodecanoate, t-butylperbenzoate, t-butyl percrotonate, t-butyl perisobutyrate, di-t-butyl perphthalate, 2,2'-azo -bis(2-methylbutanenitrile) for example. Other suitable catalysts may be employed, of course. The concentration of initiator is not critical and can vary within wide limits of from about 0.1 to about 5.0 weight percent based on the total feed to the reactor.

The polyols most suitable for use in this invention are polyoxyalkylene polyether polyols or mixtures thereof which are the polymerization products of an alkylene oxide or a mixture of alkylene oxides with a polyhydric alcohol. The polyol may contain small amounts of unsaturation. The molecular weight of the polyol will be within the range of from about 500 to about 15,000, preferably from about 2,000 to about 10,000. Although typically the polyols selected for the preparation of the intermediate, the transesterification reaction, and the polymer polyol will be identical, they may all be different polyoxyalkylene polyether polyols. As discussed above, depending on the weight percent acrylate polymer in the intermediate, a third addition of polyol may not be required.

Polymer polyols according to this invention will be formed by polymerizing from about 5 to less than about 50 weight percent, preferably 10 to 45 weight percent, of the ethylenically unsaturated monomer or monomer mixture, based on the total weight of the monomer and polyol, in from about 95 to about 50 or more weight percent, preferably about 90 to about 55 weight percent, of at least one polyoxyalkylene polyether polyol in the presence of a polyol polyacrylate dispersant of the invention.

The following examples further demonstrate the preparation of intermediate products, polyol polyacrylate dispersants, polymer polyols incorporating the polyol polyacrylate dispersants, and polyurethanes made using the polymer polyols.

EXAMPLES 1-2

Two polyacrylate graft-polyol intermediate products were separately prepared using the following procedure and the amounts, materials, and process conditions identified in following Table 1.

Into a 3-liter reactor fitted with a stirrer, a condenser, a thermometer, and an addition tube and under a blanket of nitrogen was charged 100 grams of base polyol.

The reactor charge was then heated to the temperature indicated, and the specified feed charge of acrylate monomers, initiator, and additional base polyol was added.

Upon the completion of the feed charge, the in situ polymerization product of each example was held at the reaction temperature for from about ½ to one hour and then stripped of residual monomers for one hour at from 115° to 125° C. and about 5 mm Hg. The product of Example 1 was a 38 weight percent ethyl acrylate/n-butyl acrylate copolymer in ARCOL® 1130 polyol. The product of Example 2 was a 38 weight percent n-butyl acrylate homopolymer in ARCOL® 1130 polyol.

TABLE 1

POLYACRYLATE GRAFT-POLYOL INTERMEDIATE PRODUCTS

| | Example No | |
|---|---|---|
| | 1 | 2 |
| Monomer Composition | Ethyl Acrylate/ n-Butyl Acrylate | n-Butyl Acrylate |
| Monomer Weight Ratio | 50/50 | 100 |
| Base Polyol | ARCOL® 1130[1] | ARCOL® 1130 |
| Reaction Temp., °C. | 123 | 120 |
| Initiator Conc., Wt. % | 1.0 | 1.0 |
| Feed, Addition Time, h | 1.5 | 1.5 |
| Reactor Charge, g | | |
| Base Polyol | 100 | 100 |
| Feed Charge, g | | |
| Monomers | 400 | 400 |
| VAZO® 67[2] | 10.0 | 10.0 |
| Base Polyol | 500 | 500 |
| Monomer Conv., % | 94 | 96 |
| Viscosity, cps, 5/sec | 2950 | 1810 |

[1]ARCOL® 1130 polyol - a glycerine initiated polyether of propylene oxide and ethylene oxide having a hydroxyl number of 48 and containing essentially secondary hydroxyl groups available from ARCO Chemical Company.
[2]VAZO® 67 - 2,2'-azobis(2-methylbutanenitrile) polymerization catalyst available from E. I. DuPont de Nemours & Co.

EXAMPLE 3

This example demonstrates the preparation of poly(n-butyl acrylate) for use in the blend method for forming a polyol polyacrylate. Substantially the procedure described in Example 2 was used with the following changes.

An equivalent amount of xylene was substituted for the base polyol, and only 7.5 g. of the VAZO® 67 initiator was used. After stripping residual monomer and solvent, the resulting product, poly(n-butyl acrylate), had a viscosity of 12,100 cps.

EXAMPLE 4

This example demonstrates the preparation of a polyol polyacrylate dispersant of this invention by the further transesterification reaction of the polyacrylate graft-polyol intermediate of Example 1.

To a reactor fitted with an overhead stirrer and connected to a cold trap and a vacuum pump were added 100 grams of the polyacrylate graft-polyol of Example 1, an additional 100 grams of Arcol 1130 polyol, and 1.0 gram of transesterification catalyst (potassium methoxide).

The reaction mixture was subjected to a vacuum of about 5 torr and heated at about 110° C., i.e., until the viscosity of the reaction mixture was about 35,000 cps. at 25° C.

The resulting transesterification reaction product was allowed to cool and then flushed with nitrogen, diluted with tetrahydrofuran solvent and blended with 10 grams of Magnesol ® magnesium silicate.

The resulting product, a polyol polyacrylate dispersant, was isolated by filtration and solvent stripping. The dispersant had a viscosity of about 26,900 cps. at 25° C.

EXAMPLE 5

This example demonstrates the preparation of a polyol polyacrylate dispersant of this invention by the further transesterification of the polyacrylate graft-polyol product formed in Example 1.

To a reactor fitted with an overhead stirrer and connected to a cold trap and a vacuum pump were added 100 grams of the polyacrylate polyol of Example 1, an additional 100 grams of Arcol ® 1130 polyol, and 1.0 gram of transesterification catalyst (potassium methoxide).

The reaction mixture was subjected to a vacuum of about 5 torr and heated at about 110° C. i.e., until the viscosity of the reaction mixture was within the range of about 30,000 cps. at 25° C.

The resulting transesterification reaction product was allowed to cool and then flushed with nitrogen, diluted with tetrahydrofuran solvent and blended with 10 grams of Magnesol ® magnesium silicate.

The resulting polyol polyacrylate dispersant was isolated by filtration and solvent stripping. It had a viscosity of about 23,400 cps. at 25° C.

EXAMPLE 6

Following substantially the procedure of Example 4, but using 100 grams of the polyacrylate graft-polyol product of Example 2, another polyol polyacrylate dispersant was prepared.

The resulting polyol polyacrylate dispersant had a viscosity of 25,400 cps. at 25° C.

EXAMPLE 7

This example demonstrates the preparation of a polyol polyacrylate dispersant of this invention.

To a reactor fitted with an overhead stirrer and connected to a cold trap and vacuum pump were added 150 grams of Arcol ® 1130 polyol and 10.7 ml. of 1 N. aqueous potassium hydroxide (transesterification catalyst). The mixture was heated to 100°-110° C. for one hour under a pressure of 5 torr and then cooled to room temperature. Next, 76.0 grams of the polyacrylate graft-polyol of Example 2 was added.

This mixture was heated to 50°-55° C. under a pressure of 5 torr for about 2 hours, and the resulting transesterification reaction product was cooled, flushed with nitrogen diluted with tetrahydrofuran solvent, and blended with 10 grams of Magnesol ® magnesium silicate.

The polyol polyacrylate dispersant was isolated by filtration and solvent stripping and found to have a viscosity of 9440 cps. at 25° C.

EXAMPLE 8

This example demonstrates the preparation of a polyol polyacrylate dispersant of this invention.

To a reactor fitted with an overhead stirrer and connected to a cold trap and vacuum pump were added 100 grams of ARCOL ® 1130 polyol and 5.3 ml. of 1 N-aqueous sodium hydroxide (transesterification catalyst). The mixture was heated to 110° C. for 1.5 hours under a pressure of 5 torr and then cooled to room temperature. Next, 100 grams of the polyacrylate graft-polyol product of Example 2 were added. This mixture was heated to 100°-110° C. for 7 hours at 3-5 torr and the resulting transesterification reaction product was cooled, flushed with nitrogen, diluted with tetrahydrofuran, and blended with 10 grams of Magnesol ® magnesium silicate.

The polyol polyacrylate dispersant was isolated by filtration and solvent stripping and found to have a viscosity of 7080 cps. at 25° C.

EXAMPLE 9

This example demonstrates the preparation of a polyol polyacrylate dispersant of this invention.

To a reactor fitted with an overhead stirrer and connected to a cold trap and vacuum pump were added 150 grams of ARCOL ® 1130 polyol and 10.7 ml. of 1 N-aqueous potassium hydroxide (transesterification catalyst). The mixture was heated to 100°-110° C. for one hour under a pressure of 5 torr and then cooled to room temperature. Next, a blend of 45.0 grams of ARCOL ® 1130 and 30.0 grams of poly(n-butyl acrylate) prepared according to Example 3 were added. This mixture was heated to 100° C. for 3.6 hours, then 110°-116° C. for 6.0 hours under a pressure of 5 torr, and the resulting transesterification reaction product was cooled, flushed with nitrogen diluted with tetrahydrofuran solvent, and blended with 20 grams of Magnesol ® magnesium silicate.

The polyol polyacrylate dispersant was isolated by filtration and solvent stripping and found to have a viscosity of 6000 cps. at 25° C.

EXAMPLES 10-27

Eighteen polymer polyols were made each employing one of the polyol polyacrylate dispersants prepared in Examples 4-9 and the following procedure.

Into a 3-liter, 4-neck resin kettle equipped with a stirrer, condenser, thermometer, addition tube, and under a blanket of nitrogen were charged the amounts of base polyol and polyol polyacrylate dispersant identified under the heading "Reactor Charge" in following Table 2.

After the kettle was heated to the specified reaction temperature the amounts of monomers, initiator, and base polyol identified under the heading "Feed Charge" were added over a two-hour time period. All products were milk-white dispersions.

All dispersions were held at the reaction temperature for about ½ to 1 hour and then stripped for 1 to 1½ hours at 90°-120° C. and less than 5 mm Hg. Table 2 contains the properties of the resultant polymer polyols of this invention made with polyol polyacrylate dispersants.

TABLE 2

| Polymer Polyols Incorporating Polyol Polyacrylate Dispersants | | | | | | | | | |
|---|---|---|---|---|---|---|---|---|---|
| | Example No. | | | | | | | | |
| | 10 | 11 | 12 | 13 | 14 | 15 | 16 | 17 | 18 |
| Monomer Charge, Wt % | 20 | 20 | 20 | 20 | 20 | 20 | 20 | 20 | 20 |

TABLE 2-continued

Polymer Polyols Incorporating Polyol Polyacrylate Dispersants

|  |  |  |  |  |  |  |  |  |  |
|---|---|---|---|---|---|---|---|---|---|
| SAN Weight Ratio | 70/30 | 70/30 | 70/30 | 70/30 | 75/25 | 80/20 | 90/10 | 100/0 | 70/30 |
| Base Polyol | Arcol 1130 | → | → | → | → | → | → | → | → |
| Polyol Polyacrylate Dispersant of Example No. | 4 | 4 | 4 | 6 | 6 | 6 | 6 | 6 | 6 |
| % Dispersant (based on total reactants less initiator) | 2.5 | 1.25 | 0.8 | 0.4 | 1.2 | 0.8 | 0.8 | 4.0 | 0.8 |
| % of Total Polyol in Feed | 94 | 94 | 94 | 94 | 94 | 94 | 94 | 90 | 80 |
| Reaction Temp., °C. | 120 | 120 | 120 | 120 | 120 | 120 | 120 | 120 | 120 |
| Initiator Conc., Wt. % | 0.5 | 0.5 | 0.5 | 0.5 | 0.5 | 0.5 | 0.5 | 0.5 | 0.5 |
| Feed, Addition Time, h | 2.0 | 2.0 | 2.0 | 2.0 | 2.0 | 2.0 | 2.0 | 2.0 | 2.0 |
| Reactor Charge, g | | | | | | | | | |
| Base Polyol | 50 | 75 | 84 | 92 | 76 | 84 | 84 | 40 | 304 |
| Dispersant | 50 | 25 | 16 | 8 | 24 | 16 | 16 | 40 | 16 |
| Feed Charge, g | | | | | | | | | |
| Styrene | 280 | 280 | 280 | 280 | 300 | 320 | 360 | 200 | 280 |
| Acrylonitrile | 120 | 120 | 120 | 120 | 120 | 80 | 40 | — | 120 |
| Initiator (VAZO 67) | 10.0 | 10.0 | 10.0 | 10.0 | 10.0 | 10.0 | 10.0 | 5.0 | 10.0 |
| Base Polyol | 1500 | 1500 | 1500 | 1500 | 1500 | 1500 | 1500 | 720 | 1280 |
| Dispersion Properties | | | | | | | | | |
| Conversion % Overall | 94 | 93 | 94 | 94 | 91 | 92 | 85 | 79 | 94 |
| Viscosity, cps 20/sec. | 1340 | 1260 | 1170 | 1220 | 1170 | 1080 | 1030 | 1240 | 1330 |
| Particle Size, μ (IPA) | .58 | .66 | .62 | .78 | .58 | .76 | 1.51 | 1.3 | .61 |
| Centrifugable Solids, Wt. % | 1.7 | 1.5 | 1.6 | 1.8 | 1.5 | 1.6 | 6.3 | 12.7 | 1.8 |

| | Example No. | | | | | | | | |
|---|---|---|---|---|---|---|---|---|---|
| | 19 | 20 | 21 | 22 | 23 | 24 | 25 | 26 | 27 |
| Monomer Charge, Wt % | 40 | 40 | 40 | 40 | 40 | 40 | 42 | 40 | 40 |
| SAN Weight Ratio | 70/30 | 75/25 | 75/25 | 75/25 | 70/30 | 75/25 | 75/25 | 75/25 | 75/25 |
| Base Polyol | Arcol 1130 | → | → | → | → | → | → | → | → |
| Polyol Polyacrylate Dispersant of Example No. | 5 | 5 | 5 | 6 | 6 | 7 | 7 | 8 | 9 |
| % Dispersant (based on total reactants less initiator) | 3.0 | 3.0 | 1.8 | 1.2 | 1.2 | 1.8 | 2.3 | 2.4 | 2.4 |
| % of Total Polyol in Feed | 92 | 92 | 92 | 92 | 92 | 92 | 92 | 92 | 92 |
| Reaction Temp., °C. | 120 | 120 | 120 | 120 | 120 | 120 | 120 | 120 | 120 |
| Initiator Conc., Wt. % | 0.6 | 0.6 | 0.6 | 0.6 | 0.6 | 0.6 | 0.6 | 0.6 | 0.6 |
| Feed, Addition Time, h | 2.0 | 2.0 | 2.0 | 2.0 | 2.0 | 2.0 | 2.0 | 2.0 | 2.0 |
| Reactor Charge, g | | | | | | | | | |
| Base Polyol | 40 | 40 | 64 | 76 | 76 | 64 | 53.6 | 52 | 52 |
| Dispersant | 60 | 60 | 36 | 24 | 24 | 36 | 46.4 | 48 | 48 |
| Feed Charge, g | | | | | | | | | |
| Styrene | 560 | 600 | 600 | 600 | 560 | 600 | 630 | 600 | 600 |
| Acrylonitrile | 240 | 200 | 200 | 200 | 240 | 200 | 210 | 200 | 200 |
| Initiator (VAZO 67) | 12.0 | 12.0 | 12.0 | 12.0 | 12.0 | 12.0 | 12.0 | 12.0 | 12.0 |
| Base Polyol | 1100 | 1100 | 1100 | 1100 | 1100 | 1100 | 1060 | 1100 | 1100 |
| Dispersion Properties | | | | | | | | | |
| Conversion % Overall | 97 | 96 | 97 | 96 | 97 | 96 | 96 | 96 | 96 |
| Viscosity, cps 20/sec. | 6630 | 6370 | 4890 | 4300 | 7160 | 4230 | 5560 | 4710 | 4230 |
| Particle Size, μ (IPA) | .60 | .67 | .72 | .82 | .75 | .86 | .78 | .82 | .82 |
| Centrifugable Solids, Wt. % | 3.8 | 3.8 | 3.4 | 3.7 | 6.5 | 3.9 | 4.7 | 3.6 | 4.0 |

From the above data, it will be seen that the polyol polyacrylate dispersants of this invention are effective in achieving stable dispersions at high solids contents. Moreover, the particle sizes, viscosities, and centrifugable solids of the polymer polyols produced using the polyol polyacrylate dispersants are excellent.

Polyurethanes may be made by reacting the polymer polyols described above with an organic polyisocyanate in the presence of a polyurethane formation catalyst. If a foam is desired, a blowing agent such as a halocarbon (trichlorofluoromethane, for example), water, or carbon dioxide may also be present. The polyurethane formation catalysts are typically tin catalysts or tertiary amine compounds. Other conventional additives such as silicone surfactants, fire retardant additives (melamine, for example), etc. may also be present. For more information in preparing polyurethanes, particularly flexible polyurethanes, see U.S. Pat. Nos. 4,338,408, 4,342,687, and 4,381,353, incorporated herein by reference. The foams made using the polymer polyols described herein have excellent physical properties. Flexible carpet underlay foam and molded automobile foam may be prepared using the polymer polyols and techniques described herein.

A typical slab polyurethane foam is prepared by first charging polymer polyol, water, catalyst, and silicone surfactant into a vessel while stirring vigorously. Next, the polyisocyanate is added to the vessel with stirring, and the resulting mixture is immediately poured into a cardboard cakebox; and the polyurethane foam allowed to rise and cure at room temperature.

Using substantially the procedure described above, a slab polyurethane foam suitable for use as carpet underlayment was prepared from the following amounts of ingredients.

| Ingredient | Amount (parts by wt.) |
|---|---|
| Polymer Polyol of Example 22 | 100 |
| Water | 2.2 |
| L-6202 silicon surfactant[1] | 0.8 |
| Amine[2] | 0.3 |
| T-10 Organo Tin Catalyst (50% Active)[3] | 0.4 |

-continued

| Ingredient | Amount (parts by wt.) |
| --- | --- |
| Toluene Diisocyanate | 29.6 |

[1] Available from Union Carbide Corporation.
[2] Prepared by blending 2 parts B11 and 1 part 33LV, both available from Air Products and Chemicals, Inc., and 3 parts Thanol ® F3020, available from ARCO Chemical Company.
[3] Available from Air Products and Chemicals, Inc.

The foam reactivity was acceptable, and the resulting foam possessed excellent physical properties.

It will be evident from the foregoing that various modifications can be made to this invention. Such, however, are considered as being within the scope of the invention.

What is claimed is:

1. A stable polymer polyol composition comprising a continuous phase, a disperse phase within the continuous phase, and a dispersant for enhancing the stability of the polymer polyol, wherein
    (a) the disperse phase consists essentially of vinyl polymer particles;
    (b) the continuous phase consists essentially of a first polyoxyalkylene polyether polyol; and
    (c) the dispersant is a polyol polyacrylate formed by polymerizing from about 5 to about 90 weight percent of at least one acrylate monomer selected from the group consisting of $C_1$-$C_{20}$ alkyl esters of acrylic and methacrylic acids in from about 95 to about 10 weight percent of a second polyoxyalkylene polyether polyol to form a single phase homogeneous liquid intermediate reaction product followed by transesterifying from about 1 to about 30 mole percent of the total ester groups of the acrylate in the intermediate reaction product with the hydroxyl groups of said second polyoxyalkylene polyether polyol to form the polyol polyacrylate dispersant,
said dispersant being employed in an amount sufficient to enhance the stability of the resulting polymer polyol as compared to the stability of the polymer polyol in the absence of polyol polyacrylate dispersant.

2. The polymer polyol composition of claim 1 in which said dispersant (c) is formed by polymerizing from about 20 to about 50 weight percent of the at least one acrylate monomer in from about 80 to about 50 weight percent of the polyol.

3. The polymer polyol composition of claim 1 in which said dispersant (c) is employed in an amount within the range of from about 0.1 to about 10 weight percent based on the total weight of (a)+(b)+(c).

4. The polymer polyol composition of claim 1 in which said dispersant (c) is employed in an amount within the range of from about 0.3 to about 5 weight percent based on the total weight of (a)+(b)+(c).

5. The polymer polyol composition of claim 1 in which the weight ratio of the disperse phase (a) to the continuous phase (b) is within the range of from about 1:19 to about 1:1.

6. The polymer polyol composition of claim 1 in which said first and second polyoxyalkylene polyether polyols have the same composition.

7. The polymer polyol composition of claim 1 in which said first and second polyoxyalkylene polyether polyols have different compositions.

8. The polymer polyol composition of claim 1 in which an additional second polyoxyalkylene polyol or a third polyoxyalkylene polyol is added to dilute the acrylate just prior to transesterifying.

9. The polymer polyol composition of claim 1 in which said disperse phase is polystyrene particles.

10. The polymer polyol composition of claim 1 in which said disperse phase is styrene/acrylonitrile copolymer particles.

11. The polymer polyol composition of claim 1 in which said disperse phase is styrene/N-phenylmaleimide copolymer particles.

12. The polymer polyol composition of claim 1 in which said disperse phase is styrene/N-phenylmaleimide/acrylonitrile copolymer particles.

13. The polymer polyol composition of claim 1 in which said continuous phase is a polyoxyalkylene polyether polyol having a molecular weight within the range of from about 500 to about 15,000.

14. The polymer polyol composition of claim 1 in which said continuous phase is a polyoxyalkylene polyether polyol having a molecular weight within the range of from about 2,000 to about 10,000.

15. A stable polymer polyol composition comprising a continuous phase, a disperse phase within the continuous phase, and a dispersant for enhancing the stability of the polymer polyol, wherein
    (a) the disperse phase consists essentially of vinyl polymer particles;
    (b) the continuous phase consists essentially of a first polyoxyalkylene polyether polyol; and
    (c) the dispersant is a polyol polyacrylate formed by blending from about 5 to about 90 weight percent of at least one acrylate polymer selected from the group consisting of homopolymers and copolymers of $C_1$-$C_{20}$ alkyl esters of acrylic and polymers and copolym methacrylic acids with from about 95 to about 10 weight percent of a second polyoxyalkylene polyether polyol to form a single phase homogeneous liquid intermediate blend followed by transesterifying from about 1 to about 30 mole percent of the total ester groups of the acrylate with the hydroxyl groups of the second polyoxyalkylene polyether polyol to form the polyol polyacrylate dispersant, said dispersant being employed in an amount sufficient to enhance the stability of the resulting polymer polyol as compared to the stability of the polymer polyol in the absence of polyol polyacrylate dispersant.

16. The polymer polyol composition of claim 15 in which said dispersant (c) is formed by blending from about 20 to about 50 weight percent of the at least one acrylate monomer in from about 80 to about 50 weight percent of the polyol.

17. The polymer polyol composition of claim 15 in which said dispersant (c) is employed in an amount within the range of from about 0.1 to about 10 weight percent based on the total weight of (a)+(b)+(c).

18. The polymer polyol composition of claim 15 in which said dispersant (c) is employed in an amount within the range of from about 0.3 to about 5 weight percent based on the total weight of (a)+(b)+(c).

19. The polymer polyol composition of claim 15 in which the weight ratio of the disperse phase (a) to the continuous phase (b) is within the range of from about 1:19 to about 1:1.

20. The polymer polyol composition of claim 15 in which said first and second polyoxyalkylene polyether polyols have the same composition.

21. The polymer polyol composition of claim 15 in which said first and second polyoxyalkylene polyether polyols have different compositions.

22. The polymer polyol composition of claim 15 in which additional said second polyoxyalkylene polyether polyol or a third polyoxylakylene polyol is added to dilute the acrylate just prior to transesterifying.

23. The polymer polyol composition of claim 15 in which said disperse phase is polystyrene particles.

24. The polymer polyol composition of claim 15 in which said disperse phase is styrene/acrylonitrile copolymer particles.

25. The polymer polyol composition of claim 15 in which said disperse phase is styrene/N-phenylmaleimide copolymer particles.

26. The polymer polyol composition of claim 15 in which said disperse phase is styrene/N-phenylmaleimide/acrylonitrile copolymer particles.

27. The polymer polyol composition of claim 15 in which said continuous phase is a polyoxyalkylene polyether polyol having a molecular weight within the range of from about 500 to about 15,000.

28. A method for producing the stable polymer polyol of claim 1 which comprises polymerizing an ethylenically unsaturated monomer or mixture of monomers to form the vinyl polymer particles in a blend of the first polyoxyalkylene polyether polyol and the polyol polyacrylate dispersant.

29. A method for producing the stable polymer polyol of claim 15 which comprises polymerizing an ethylenically unsaturated monomer or mixture of monomers to form the vinyl polymer particles in a blend of the first polyoxyalkylene polyether polyol and the polyol polyacrylate dispersant.

30. A method of stabilizing a polymer polyol comprising vinyl polymer particles dispersed in a continuous polyether polyol phase against phase separation, the method comprising incorporating into the polymer polyol composition a polyol polyacrylate dispersant formed by polymerizing from about 5 to about 90 weight percent of at least one acrylate monomer selected from the group consisting of $C_1$-$C_{20}$ alkyl esters of acrylic and methacrylic acids in from about 95 to about 10 weight percent of a polyoxyalkylene polyether polyol to form a single phase homogeneous liquid intermediate reaction product followed by transesterifying from about 1 to about 30 mole percent of the total ester groups of the acrylate in the intermediate reaction product with the hydroxyl groups of a polyoxyalkylene polyether polyol to form the polyol polyacrylate dispersant.

31. A method of stabilizing a polymer polyol comprising vinyl polymer particles dispersed in a continuous polyether polyol phase against phase separation, the method comprising incorporating into the polymer polyol composition a polyol polyacrylate dispersant formed by blending from about 5 to about 90 weight percent of at least one acrylate polymer selected from the group consisting of homopolymers and copolymers of $C_1$-$C_{20}$ alkyl esters of acrylic and methacrylic acids with from about 95 to about 10 weight percent polyoxyalkylene polyether polyol to form a single phase homogeneous liquid intermediate blend followed by transesterifying from about 1 to about 30 mole percent of the total ester groups of the acrylate with the hydroxyl groups of a polyoxyalkylene polyether polyol to form the polyol polyacrylate dispersant, said dispersant being employed in an amount sufficient to enhance the stability of the resulting polymer polyol as compared to the stability of the polymer polyol in the absence of polyol polyacrylate dispersant.

* * * * *